H. A. CROSSLEY.

Stave Jointer.

No. 9,441. Reissued Nov. 2, 1880.

WITNESSES:

Jas. E. Hutchinson.

Henry C. Hazard.

INVENTOR.

H. A. Crossley, by

Geo. S. Prindle, his Atty.

N. PETERS, PHOTO-LITHOGRAPHER, WASHINGTON, D. C.

UNITED STATES PATENT OFFICE.

HARRY A. CROSSLEY, OF CLEVELAND, OHIO.

STAVE-JOINTER.

SPECIFICATION forming part of Reissued Letters Patent No. 9,441, dated November 2, 1880.

Original No. 113,268, dated April 4, 1871. Application for reissue filed September 17, 1880.

*To all whom it may concern:*

Be it known that I, HARRY A. CROSSLEY, of Cleveland, in the county of Cuyahoga and State of Ohio, did invent certain new and useful Improvements in Stave-Jointers, for which Letters Patent No. 113,268 were issued to me upon the 4th day of April, A. D. 1871, which Letters Patent have been found defective in that the specification and claims do not cover and embrace all of the original invention as set forth in the application filed in the Patent Office on the 27th day of January, 1871. Now, therefore, being desirous of reissuing said Letters Patent herewith surrendered, I have prepared and do hereby declare that the following is a full, clear, and exact description of the said invention, reference being had to the accompanying drawings, making a part of this specification, in which—

Figure 1:
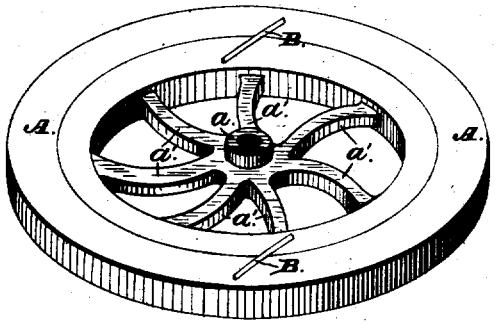
Figure 2:
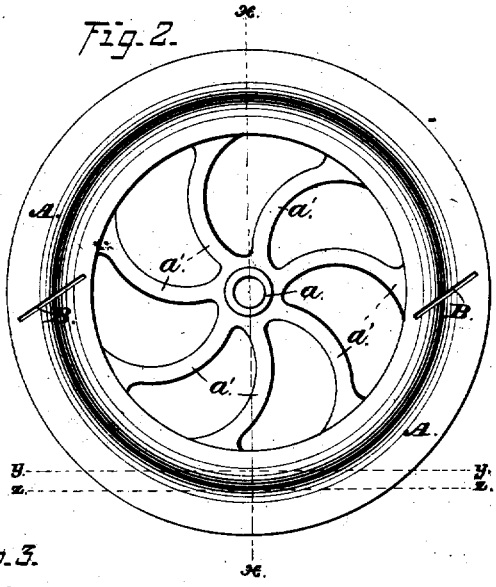
Figure 3:
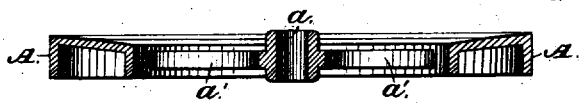
Figure 6:
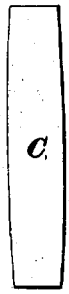
Figure 4:
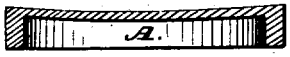
Figure 7:
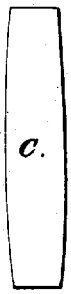
Figure 5:
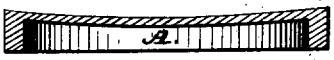

Figure 1 is a perspective view of my improved cutter-wheels. Fig. 2 is a front elevation of the same. Fig. 3 is a central cross-section of said wheel on line *x x* of Fig. 2. Figs. 4 and 5 are like views of the same upon lines *y y* and *z z*, respectively, of said figure; and Figs. 6 and 7 are plan views of staves having their edges jointed by being applied to said cutter-wheel at the points designated by lines *y y* and *z z*, respectively, whereby more or less fullness at the bilge is secured.

Letters of like name and kind refer to like parts in each of the figures.

In the jointing of staves great difficulty has heretofore been experienced in securing the necessary form of the edges so as to produce tight joints when the staves were placed in a barrel, the defect most commonly found being a fullness at the quarters which prevented the staves from closing together at the bilge.

To obviate this difficulty is the design of my invention, which consists in a wheel for jointing staves having its face formed upon a straight line from its outer edge inward a portion of its width, and from thence to the inner edge of its cutters formed upon an inward and rearward inclining line, and provided with cutters which have their cutting-edges conformed to the said wheel-face, substantially as and for the purpose hereinafter specified.

In the annexed drawings, A represents a wheel, having, preferably, an open center that is filled with a hub, *a*, and spokes *a'*. The face of the wheel A, outside of its open center, has any desired width and is slightly dished, as seen in Fig. 3. From its outer edge said face extends in a straight line radially inward for a certain distance, and from thence to its inner edge has relatively a rearward inclination, as shown in said figure.

Within the face of the wheel A are two or more cutters, B, which are each preferably arranged at a slight inclination from a radial line, and have their cutting-edges ground to conform to the line of said wheel-face. If, now, the wheel A is combined with the usual mechanism whereby it may be rotated and staves brought into contact with its cutters, the edge of each stave will be presented to said face upon substantially the lines *z z* of Fig. 2, at which lines said wheel-face will have the precise form necessary to be given to the stave-edge in order to produce a perfect joint between the same and other staves, and by the operation of the cutters B each stave will be cut away at its edge until it exactly conforms to the line of said wheel-face, the amount of bilge being governed by the vertical position of said stave with relation to the same.

Having thus fully set forth the nature and merits of my invention, what I claim as new is—

A wheel for jointing staves having its face formed upon a straight line from its outer edge inward a portion of its width, and from thence to the inner edge of its cutters formed upon an inward and rearward inclining line, and provided with cutters which have their cutting-edges conformed to the said wheel-face, substantially as and for the purpose specified.

In testimony that I claim the foregoing I have hereunto set my hand this 7th day of August, A. D. 1880.

HARRY A. CROSSLEY.

Witnesses:
JOHN C. HEMMETER,
S. K. HEISLEY.